May 16, 1933. A. H. ADAMS ET AL 1,908,723

EYEGLASSES

Filed Dec. 6, 1929

ARTHUR H. ADAMS,
SAMUEL F. HAMPTON,

INVENTOR

BY

ATTORNEY

Patented May 16, 1933

1,908,723

UNITED STATES PATENT OFFICE

ARTHUR H. ADAMS AND SAMUEL F. HAMPTON, OF YONKERS, NEW YORK

EYEGLASSES

Application filed December 6, 1929. Serial No. 412,030.

This invention relates to eye glasses, particularly those of the Oxford type.

Eye glasses of the Oxford type of construction require spring hinge joints for connecting the bridge to the frames. These joints have been made, according to the prior art, substantially integral with the bridge and the frame elements so that if certain parts of a hinge are broken, it is necessary to provide a new rim member. This may mean that there will be delay in making the repairs, and furthermore, makes the repair work relatively expensive. This is especially true of glasses having horn or composition rims, wherein it is the practice to imbed the spring of the hinge in the body of the rim in such manner that it cannot be removed readily.

An object of the present invention is to provide a nose piece unit comprising a bridge piece having the hinge members completely connected thereto, in working condition, so that the entire unit may be readily connected to a pair of eye glass rims by rivets or other suitable means. By this construction we are able to avoid the hinge assembly steps necessary to devices constructed in accordance with the prior art. In case of breakage of a portion of the nose piece unit, it is necessary merely to remove the rivets holding the unit to the rims and replace it with a new unit, which it provided with hinges fully assembled and in working condition. This enables any oculist or optometrist to make necessary repairs quickly and efficiently. As the hinge unit is entirely assembled with the springs thereof evenly tensioned and the pivot points accurately adjusted, the repaired article will be as good as new. Where the hinges are constructed in the prior art manner, there is always danger that the operating springs will not be evenly tensioned or the pivot points properly adjusted by the repair man during the assembly process.

The above mentioned and other objects and advantages and manner of attaining them will be made clear in the following description and accompanying drawing.

In the drawing, Fig. 1 is a view in elevation and partly in section, of an eye glass nose piece constructed in accordance with our invention;

Figure 1:
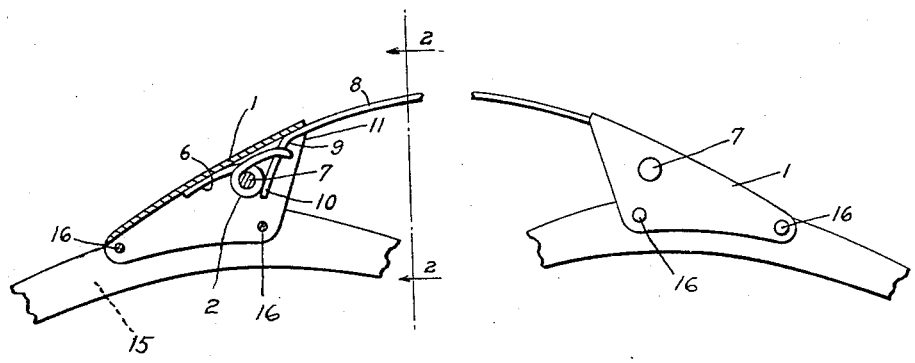
Figure 2:
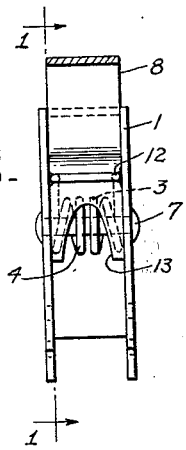
Fig. 2 is a sectional view, taken along line 2—2 of Fig. 1.
Figure 3:
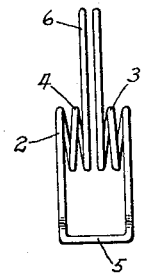
Fig. 3 shows the spring used in the construction of the hinge.
Figure 4:
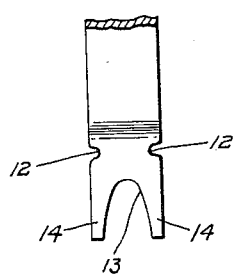
Fig. 4 shows the end of the bridge member forming a part of the nose piece.

In Fig. 1, reference numeral 1 indicates a housing or clip which is bent in the form of a channel, as shown most clearly in Fig. 2. 2 is a spring of coiled form comprising two similar portions 3, 4, which are connected at their outer ends by an element to form a loop 5, at their inner ends having extensions 6. This spring is held at its proper working position, with the ends 6 contacting with the top of the housing member, by means of a rivet 7. Any other suitable means may be used in place of the rivet 7, i. e., projections might be embossed from the sides of the housing member so as to project slightly into the ends of the spring 2. A bridge member 8 of resilient material having an end bent down at an angle, as shown at 9, passes through the loop 5 and contacts with the side of the spring at 10. The end of the main portion of the bridge member next to the angularly bent end contacts with the top of the channel member or clip, as shown at 11. The bridge member is therefor held in position by three points of support. One of these is its point of contact with the clip at 11, another the point of contact with the side of the spring 10, and the third, the point of contact of the loop 5 with the angularly bent part of the member. The loop 5, due to the tension of the spring, tends to rotate in a counter-clockwise direction, as seen in Fig. 1, thereby holding the bridge member resiliently in its proper position, as shown. When it is desired to fold up the eye glasses, as is customary with the Oxford type, the two lens-holding rims may be moved towards each other to interlock, this movement being permitted by the rotation of the bridge 8 around the spring 2 or rivet 7 in a clockwise direction, against the tension of the spring, as exerted by the loop 5 and ends 6. For preventing the bridge member from longitudinal displacement, a pair of notches 12 may be provided. The two sides of the loop 5 fit into these notches, thereby assuring that the bridge member 8 will fit closely within the opening in the channel-shaped housing, so that lateral looseness between the bridge member and the housing, with its attached lens-holding rims, will be avoided. In order to reduce the friction between the side of the spring and the end of the bridge member, a piece of material may be cut out of the member, as shown at 13. This insures that the rubbing between the parts and the accompanying wear will be reduced to a minimum, and will be further reduced because of the fact that two prongs 14, formed by the cutting out of 13, will move with the outer coils of the spring 2 at substantially the same linear speed during flexing of the hinge, because of the peculiar double coil-shaped construction. The spring 2 may be made in the usual single coil form with the end 6 at one side and at the other side an angular bent end portion forming the equivalent of loop 5. However, it is preferable to utilize a double spring constructed in the same general manner as shown. This structure is not only more evenly balanced, but also stronger, because of the fact that there are two coils acting together. If the additional stiffness in the spring is not required, the entire spring may be made smaller in overall dimensions, while at the same time securing the operating characteristics of a single spring of larger dimensions.

For attaching the housing or clip 1 to the lens-holding rim 15, holes 16 are provided through which rivets or screws may be passed. When it is desired to repair a pair of glasses having a broken hinge or bridge member, it is necessary merely to remove the rivets at 16 and connect to the rims an entirely new nose piece unit.

We have described a particular embodiment of our invention merely for the purposes of illustration and it will be understood that the invention is capable of a wide variety of modifications and adaptations within the scope thereof, as expressed in the following claims.

What is claimed is:

1. In a nose piece for eye glasses, a clip having a channel-like form, a coil spring positioned transversely within said channel, means for holding said spring in position, a resilient bridge piece projecting within said channel and adapted to be resiliently retained therein by said spring, and means whereby an eyeglass frame may be removably attached to said clip without disturbing the resilient connection between the bridge and the clip.

2. A device in accordance with claim 1, wherein the end of the bridge piece is bent at an angle, one arm of which engages the top wall of the channel and the other arm of which engages the side of the spring, said spring having a projecting end bent sideways to engage the bridge piece at the inner side of the angle, so as to maintain said bridge piece firmly in position.

3. A device in accordance with claim 1, wherein the spring is made of two co-axial coils having their outer ends joined together to form a loop, the end of the bridge piece projecting within said loop, whereby said bridge piece is held firmly positioned.

4. A nose piece unit for eye glasses comprising a clip having means for the attachment of an eye glass frame, a coil spring positioned transversely of said clip and secured thereto, said spring having one end in engagement with a portion of said clip and having at its other end a free portion, and a bridge member, said member having three points of support, one by contact with the side of said spring, another by contact with a portion of said clip, and a third by resilient engagement with the free portion of said spring.

5. A device in accordance with claim 4, wherein the free portion of the spring is bent at an angle and the bridge member is prevented from longitudinal displacement by means of notches in the side thereof, with which the free portion of said spring engages.

6. A device in accordance with claim 4, wherein the end of the bridge member engages with the side of the spring, and is cut out intermediate its edges to reduce the area of rubbing contact with said spring.

In testimony whereof, we have signed our names to this specification this 7th day of November 1929.

ARTHUR H. ADAMS.
SAMUEL F. HAMPTON.